(12) United States Patent
Halasy-Wimmer et al.

(10) Patent No.: US 7,434,669 B2
(45) Date of Patent: Oct. 14, 2008

(54) HYDRAULIC VEHICLE BRAKE

(75) Inventors: Georg Halasy-Wimmer, Markgröningen (DE); Lothar Schiel, Hofheim (DE); Rolf Weiler, Eppstein (DE); Jürgen Balz, Hünstetten-Oberlibbach (DE); Peter Schack, Seligenstadt (DE); Thomas Bauer, Frankfurt/Main (DE); Stefan A. Drumm, Saulheim (DE); Andreas Heise, Möfelden (DE); Joachim Scholer, Frankfurt/Main (DE); Stefan Johannes Schmitt, Eltville (DE); Andreas Pohlmann, Eschborn (DE); Thomas Winkler, Mainz (DE); Volker Knop, Ulmen (DE); Jörn Schriefer, Bickenbach (DE); Ralf Hartmann, Kriftel (DE); Karsten Schille, Hannover (DE); Johannes Görlach, Langgöns (DE); Peter Volz, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 280 days.

(21) Appl. No.: 10/527,878

(22) PCT Filed: Sep. 17, 2003

(86) PCT No.: PCT/EP03/10351

§ 371 (c)(1),
(2), (4) Date: Mar. 16, 2005

(87) PCT Pub. No.: WO2004/027282

PCT Pub. Date: Apr. 1, 2004

(65) Prior Publication Data

US 2005/0258682 A1    Nov. 24, 2005

(30) Foreign Application Priority Data

| Sep. 17, 2002 | (DE) | ................................. 102 43 226 |
| Sep. 19, 2002 | (DE) | ................................. 102 43 622 |
| Dec. 13, 2002 | (DE) | ................................. 102 58 649 |
| Mar. 18, 2003 | (DE) | ................................. 103 11 747 |
| Mar. 27, 2003 | (DE) | ................................. 103 13 707 |
| Jul. 2, 2003  | (DE) | ................................. 103 29 694 |
| Jul. 4, 2003  | (DE) | ................................. 103 30 389 |

(51) Int. Cl.
*B60T 13/04* (2006.01)

(52) U.S. Cl. ............... 188/171; 188/71.9; 188/158; 188/265

(58) Field of Classification Search ............... 188/71.9, 188/71.8, 71.7, 72.4, 171, 158, 106 F, 265, 188/170; 303/11; 310/76, 77, 75 R, 92, 310/93; 192/90
See application file for complete search history.

(56) References Cited

U.S. PATENT DOCUMENTS 3,547,233 A * 12/1970 Girvan ....................... 188/170

(Continued)

FOREIGN PATENT DOCUMENTS

DE          42 05 591 A1    8/1993

(Continued)

*Primary Examiner*—Robert A. Siconolfi
*Assistant Examiner*—Mariano Sy
(74) *Attorney, Agent, or Firm*—RatnerPrestia

(57) ABSTRACT

A hydraulic vehicle brake equipped with a parking brake device, in particular for motor vehicles, including a brake housing in which a hydraulic service pressure chamber is delimited by a brake piston, wherein the parking brake device acts on the brake piston and, in the applied condition, can be locked by a locking device, and an energy accumulator cooperating with the brake piston is equipped with at least one integrated spring element. In order to realize a simple and low-cost parking brake function that complies with legal requirements, according to the invention, the parking brake device is operable by a pressure that is introduced into the service pressure chamber and enables charging the energy accumulator.

10 Claims, 10 Drawing Sheets

U.S. PATENT DOCUMENTS

| | | | | |
|---|---|---|---|---|
| 3,633,715 A | * | 1/1972 | Burnett | 188/170 |
| 3,661,230 A | * | 5/1972 | Burnett | 188/71.9 |
| 3,944,027 A | * | 3/1976 | Yamamoto | 188/71.9 |
| 3,954,304 A | | 5/1976 | Engle | |
| 4,014,414 A | * | 3/1977 | Yamamoto et al. | 188/170 |
| 4,030,577 A | * | 6/1977 | Ogawa et al. | 188/71.9 |
| 4,215,767 A | * | 8/1980 | Shirey | 188/265 |
| 4,548,301 A | * | 10/1985 | Koshino et al. | 188/196 C |
| 4,699,253 A | | 10/1987 | Sauvée et al. | |
| 5,645,143 A | * | 7/1997 | Mohr et al. | 188/72.1 |
| 5,921,356 A | * | 7/1999 | Stringer et al. | 188/196 D |
| 5,949,168 A | | 9/1999 | Dieckmann et al. | |
| 2006/0220447 A1 | * | 10/2006 | Giers | 303/11 |

FOREIGN PATENT DOCUMENTS

| | | |
|---|---|---|
| DE | 196 20 344 A1 | 8/1997 |
| DE | 197 11 382 A1 | 10/1998 |
| DE | 197 11 382 C2 | 10/1998 |
| DE | 198 26 785 A1 | 12/1999 |
| EP | 0 551 397 B1 | 9/1994 |
| GB | 1 496 154 | 12/1977 |
| WO | WO 90/08270 | 7/1990 |

* cited by examiner

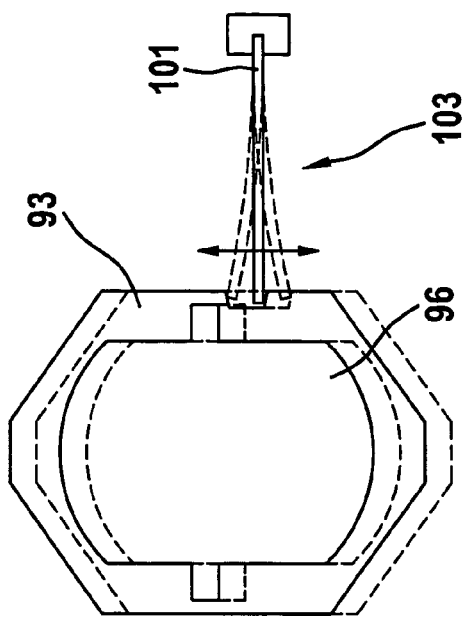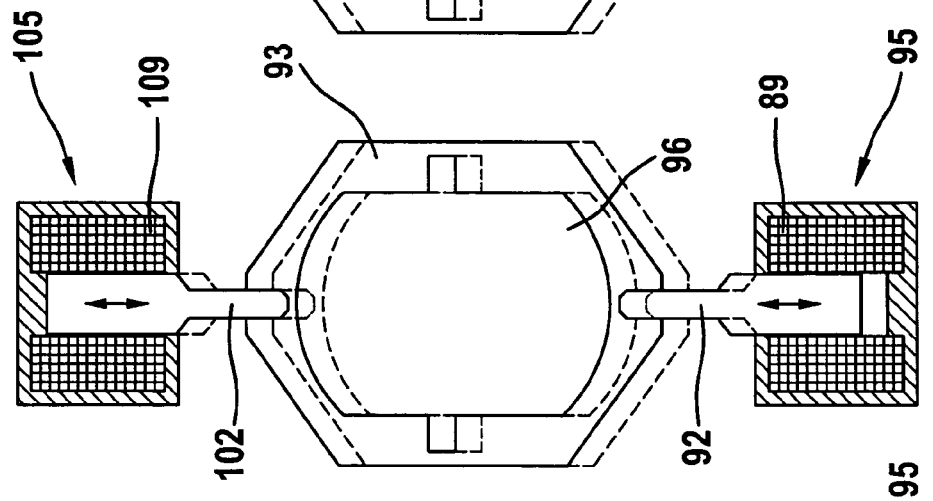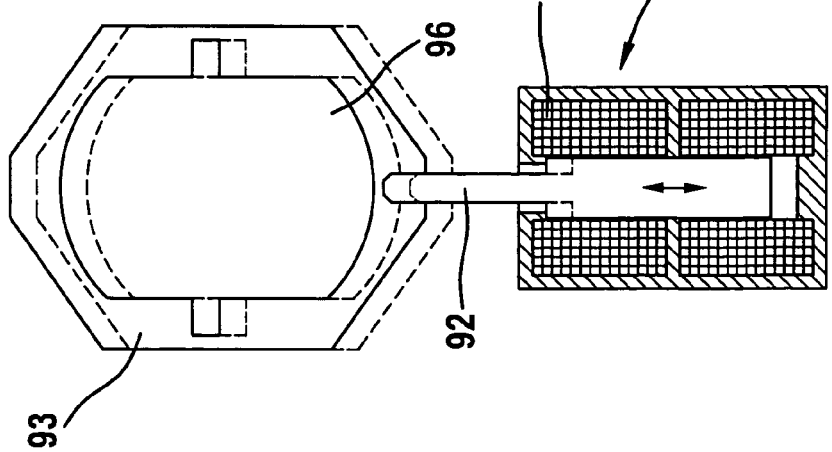

HYDRAULIC VEHICLE BRAKE

TECHNICAL FIELD

The present invention generally relates to hydraulic vehicle brakes equipped with parking brake devices and more particularly relates to a hydraulic vehicle brake equipped with a parking brake device, in particular for motor vehicles, including a brake housing in which a hydraulic service pressure chamber is delimited by a brake piston, wherein the parking brake device acts on the brake piston.

BACKGROUND OF THE INVENTION

DE 197 11 382 C2 discloses a hydraulic vehicle brake of this type.

In the prior art brake, the brake is applied in the parking brake mode by means of a two-stage gear driven by an electric motor. A parking brake operation is effected by way of energizing the electric motor, while the spring element of the energy accumulator is preloaded in addition. A reversed rotation of the electric motor is necessary for the release operation of the parking brake.

Also, combined service and parking brakes are known in the art, wherein there is provision of a hydraulic actuating device for service brake operations and mechanically actuated locking devices as a parking brake. However, these assemblies suffer from the shortcoming that an additional brake cable must be provided apart from the hydraulic supply line for each brake. The result is an increased expenditure in material and manufacture. In addition, the brake cable can be mounted to the vehicle only after installation of the brake. This assembly is usually not carried out by a particularly competent brake manufacturer, but is generally done by the vehicle manufacturer. Beside the disadvantage incurred by an increase assembly effort, the vehicle manufacturer must additionally bear the risk of a faulty assembly.

Further, German published application DE 42 05 590 C1 discloses a brake system wherein a service brake operation is carried out hydraulically and a parking brake operation is assisted by an electromotive adjusting apparatus. An electromotive adjusting apparatus of this type, which acts directly on the position of the brake pedal, admittedly, relieves the driver in terms of the force effort to be made in a parking brake operation, yet entails additional structural effort. The result is that additional costs are incurred.

BRIEF SUMMARY OF THE INVENTION

In view of the above, an object of the invention is to improve a hydraulic vehicle brake with a parking brake device of the type mentioned hereinabove to such effect that the parking brake function is realized in a simple and low-cost manner, while legal requirements are complied with.

According to the invention, this object is achieved in that the parking brake device is operable by a pressure that is introduced into the service pressure chamber and enables charging the energy accumulator.

In a favorably straightforward embodiment of the invention, the energy accumulator is formed of a recess in the brake piston accommodating the spring element, with said spring element being supported on a plate that is in a force-transmitting connection with the brake piston and cooperates with a first friction lining.

A favorable improvement of the subject matter of the invention provides that the locking device is a threaded-nut/spindle assembly, the threaded nut thereof being supported on the brake piston or being integrally designed with the brake piston, while the spindle includes a first friction surface interacting, in the locked condition, with a second friction surface that is arranged in an unrotatable manner in the brake housing.

Besides, the spindle is preferably equipped with an axial central bearing, which cooperates with a hydraulic or electromechanical device for activating the locking device.

It is particularly advantageous that the hydraulic device is formed of a closable pressure chamber being in connection with the service pressure chamber, and of an operating piston delimiting the pressure chamber and being preloaded by means of a spring assembly. Said operating piston cooperates with the spindle in such a fashion that, after decrease of the pressure prevailing in the pressure chamber, the force produced by the spring assembly is transmitted to the spindle in order to thereby cause disengagement of the friction surfaces of the locking device. The operating piston can have a two-part design, consisting of a first operating piston part and a second operating piston part, and a spring assembly is interposed between the two operating piston parts so as to allow a movement of the first operating piston part relative to the second operating piston part.

The force generated by the spring assembly is transmitted to the spindle preferably by means of the first operating piston part, while the second operating piston part has an annular design and radially encompasses the first operating piston part.

In a favorable improvement of the subject matter of the invention, the electromechanical device is formed of an actuating element that is in a force-transmitting connection with the spindle, and of a second actuating element operable by means of an electromagnetic arrangement, with both actuating elements including interacting slopes or ramps, respectively.

In another favorable design of the invention, there is provision of another spring that is supported on the brake housing and biases the spindle in the direction of the second friction surface.

At least part of the locking device is arranged in the energy accumulator in another favorable improvement of the subject matter of the invention.

The energy accumulator in this embodiment is formed of a closable accumulator pressure chamber being in connection with the service pressure chamber, and of an accumulator piston delimiting the accumulator pressure chamber and being in a force-transmitting connection with an adjusting ring that is arranged so as to be rotatable within limits. The spring element is supported on the adjusting ring, which is movable into engagement with a spindle that is connected to the brake piston by means of a non-self-locking thread, with the locking device being formed of the adjusting ring and the spindle.

The adjusting ring includes guiding projections being guided in differently long guiding grooves that are provided in the wall of a housing accommodating the energy accumulator offset in its circumferential direction, and the length of the short guiding groove defines the released position of the locking device, and the length of the longer guiding groove defines the locked position of the locking device.

In another especially favorable design variant of the subject matter of the invention, the service pressure chamber is delimited by the brake piston on one side and by an accumulator piston on the other side, on which piston a spring assembly is supported. A first contact or friction surface and a second contact or friction surface are moved into engagement with each other upon actuation of the locking device, while they are disengaged during release.

The mentioned locking device is formed of a threaded-nut/spindle assembly whose spindle is connected to the brake piston, while the threaded nut is provided with a first friction surface cooperating, in the locked condition, with a second friction surface provided in the accumulator piston, and wherein an electromagnetic device is arranged exerting a tension force on a tension-force transmitting element rigidly connected to the threaded nut and, thus, causing a rigid locking engagement between the brake piston and the accumulator piston.

A non-self-locking thread is interposed between the threaded nut and the spindle.

In another favorable improvement of the invention, the energy accumulator is formed of a closable accumulator pressure chamber connected to the service pressure chamber and of an accumulator piston delimiting the accumulator pressure chamber, with the connection between the service pressure chamber and the accumulator pressure chamber being closable by means of a mechanically operable separating valve.

The locking device in this design is provided by a threaded-nut/spindle assembly, whose spindle is driven by an electric motor, while the threaded nut includes the first contact surface that cooperates, in the locked condition, with a second contact surface designed in the brake piston.

A self-locking thread is provided between the threaded nut and the threaded spindle in these embodiments.

In another favorable improvement of the invention, the separating valve is operable by the threaded nut.

Besides, a second connection is provided between the service pressure chamber and the accumulator pressure chamber, in which a non-return valve opening towards the service pressure chamber is inserted.

It is especially favorable in this respect when a means is provided to release the parking brake in a case of emergency, said means cooperating with the operating piston or the accumulator piston, respectively. The hydraulic pressure chamber or the accumulator pressure chamber, respectively, is closable by means of an electrically operable valve.

It is arranged for in another favorable embodiment that an arresting unit maintains the energy accumulator in its charged condition during service brake operations. The arresting unit is then formed of at least one electromagnet whose coil fulfils the function of a sensor for sensing the position of a slide actuated by the armature of the electromagnet.

Furthermore, the coil fulfils the function of a sensor for monitoring the pressure introduced into the service pressure chamber or for detecting the condition of the vehicle brake or the parking brake device.

In a particularly advantageous embodiment, the arresting unit is formed of at least two electromagnets, whose armatures are connected to the slide, with the coil of the first electromagnet actuating the slide, while the coil of the second electromagnet performs the function of a sensor for detecting the slide position. As this occurs, the coils assume the function of a sensor for detecting the slide position, unless they perform the function of an actuator for actuating the slide.

In an alternative embodiment, the arresting unit is a piezoelectrically actuated actuator that actuates a slide and performs the function of a sensor for detecting the slide position. Besides, the piezoelectric actuator fulfils the function of a sensor for monitoring the pressure introduced into the service pressure chamber and for detecting the condition of the vehicle brake or the parking brake device.

Further favorable embodiments provide that the pressure buildup both in the service pressure chamber and in the hydraulic pressure chamber takes place by means of a hydraulic pump which is used as an independent pressure source of an electrohydraulic brake system, or by means of a pressure generator operable by the vehicle operator.

Expediently, the actuation of the vehicle brake of the invention can also make use of other electrically operable energy sources that are already provided in the brake system (such as an independently operable brake booster, plunger drive, high-pressure accumulator with electric valves, etc.).

BRIEF DESCRIPTION OF THE DRAWINGS

FIGS. 8a to c show lateral views of designs of an electromagnetically or piezoelectrically actuated arresting unit employable in the seventh embodiment.

DETAILED DESCRIPTION OF THE PREFERRED EMBODIMENTS

Figure 1:
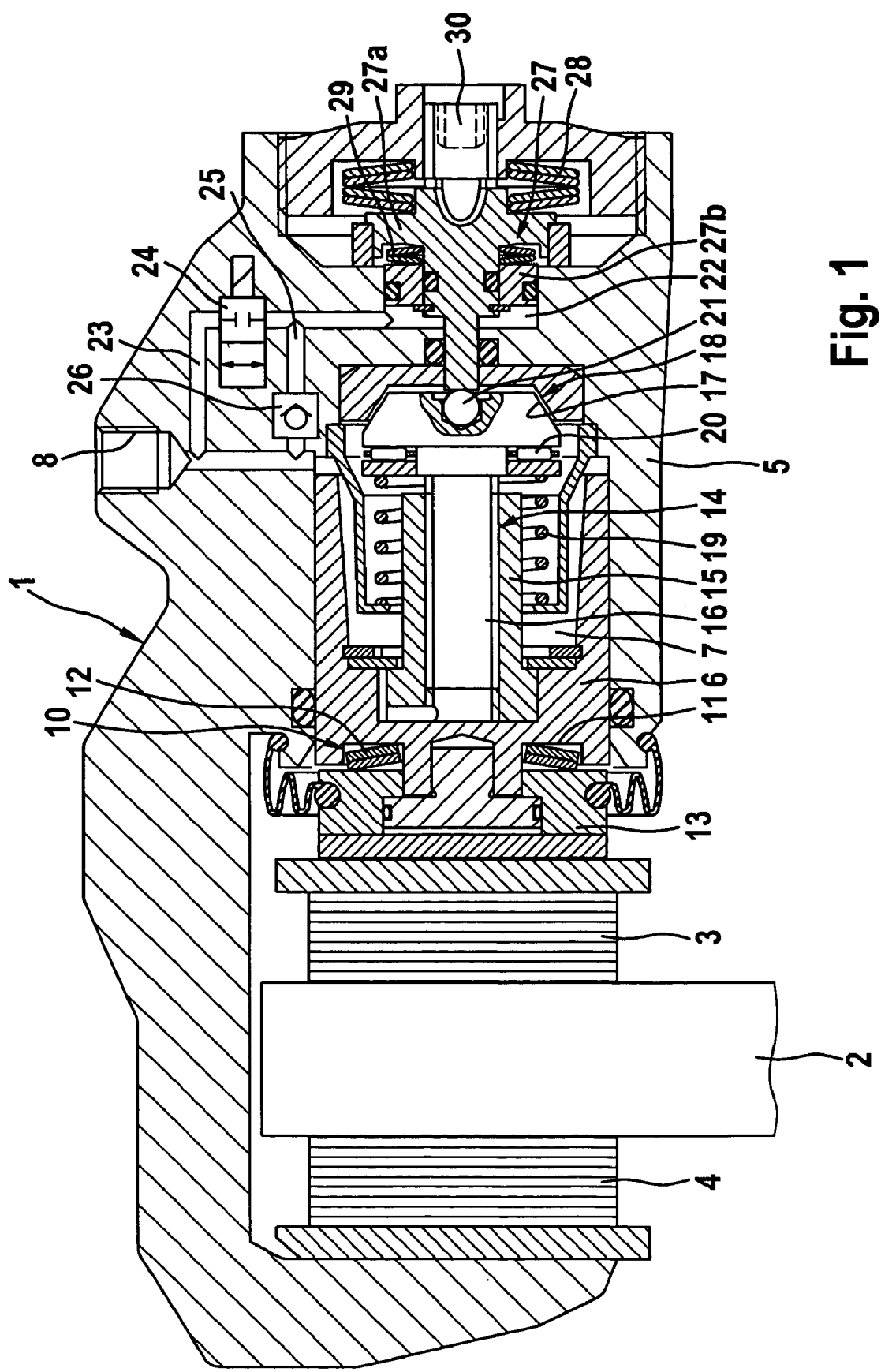
FIG. 1 is an axial cross-sectional view of a first design of the hydraulic vehicle brake of the invention in the released condition.

The hydraulic vehicle brake of the invention shown in the drawings includes a brake housing 1 straddling the outside edge of a brake disc 2 and two brake pads 3, 4 arranged on either side of the brake disc 2. The brake housing 1 forms on its inside a brake cylinder 5 receiving a brake piston 6 in an axially slidable manner. By way of a hydraulic port 8, brake fluid can be fed into the service pressure chamber 7 formed between brake cylinder 5 and brake piston 6, whereby braking pressure develops that displaces the brake piston 6 axially towards the brake disc 2. This will urge the brake pad 3 facing the brake piston 6 against the brake disc 2, whereupon the brake housing 1, as a reaction, displaces in an opposite direction and thereby urges also the other brake pad 4 against the brake disc 2.

As can be taken from FIG. 1 in particular, an energy accumulator designated with reference numeral 10 is provided in the area of the brake piston 6 close to the first friction lining 3. Said energy accumulator 10 is mainly comprised of an annular recess 11 designed in the brake piston 6 and a spring element 12 arranged in the recess 11 and resting against a plate 13, which latter is movable within limits in relation to the brake piston 6 and connected to it. It is achieved by the mentioned provisions that the application force acting on the brake pads 3, 4 is almost independent of thermally induced changes in length in the area of the brake caliper.

A spindle drive or a threaded-nut/spindle assembly, respectively, provided with reference numeral 14, forms a locking device, which is necessary for realizing a parking brake function in the first design illustrated in FIG. 1. The mentioned threaded-nut/spindle assembly 14 comprises a threaded nut 15 and a spindle 16 being in connection with each other by means of a non-self-locking thread. In this arrangement, the threaded nut 15 is rigidly connected to the brake piston 6, while the spindle 16 at its end remote from the brake piston 6 includes a preferably conical first friction surface 17, which can be moved into and out of engagement with a second friction surface 18 arranged in the brake housing 1 in an unrotatable fashion. A spring 19 supported on the brake housing 1 biases the spindle 16 in the direction of the second friction surface 18 by the intermediary of an axial bearing 20. Besides, the spindle 16 includes a central bearing 21 at its end remote from the brake piston 6. The function of the central bearing will be explained in the following.

Also, the brake housing 1 houses a cylindrical pressure chamber 22 which is connected to the hydraulic port 8 and the service pressure chamber 7, respectively. Inserted into the connection 23 of the cylindrical pressure chamber 22 to the port 8 is an electrically operable valve, preferably a normally closed (NC) valve 24 that allows connecting the two pressure chambers 7 and 22 by way of connection 23. A non-return valve 26 closing towards the pressure chamber 22 is inserted into another connection 25 between the cylindrical pressure chamber 22 and the service pressure chamber 7. Along with the pressure chamber 22, an operating piston 27 delimiting the pressure chamber 22 forms a hydraulic device for activating the above-mentioned locking device. The operating piston 27 that is biased in the direction of the locking device by means of a spring assembly 28 preferably has a two-part design and comprises a first operating piston part 27a that is axially supported on the central bearing 21 and an annular second operating piston part 27b which radially encompasses the first operating piston part 27a. A spring assembly 29 is interposed between the two operating piston parts 27a, 27b in such a way that a limited movement of the first operating piston part (27a) relative to the second operating piston part 27b can occur upon release of the parking brake. Besides, a mechanical means 30 for releasing the locking device is provided, which can be designed as a threaded pin cooperating with the first operating piston part 27a, for example.

The first design of the hydraulic vehicle brake of the invention is illustrated in FIG. 1 in the released condition of the parking brake. The parking brake is locked after buildup of hydraulic pressure in the service pressure chamber 7, by changing over the normally closed valve 24 into its open operating position or by applying hydraulic pressure to the operating piston 27. When the operating piston 27 is moved to the right in the drawing, the spindle 16 is moved until engagement of the friction surfaces 17, 18. To release the parking brake, hydraulic pressure is built up in the service pressure chamber 7, causing relief of the spindle 16 so that the friction surfaces 17, 18 are disengaged by way of the effect the spring assembly 28 takes on the operating piston 27.

Figure 2A:
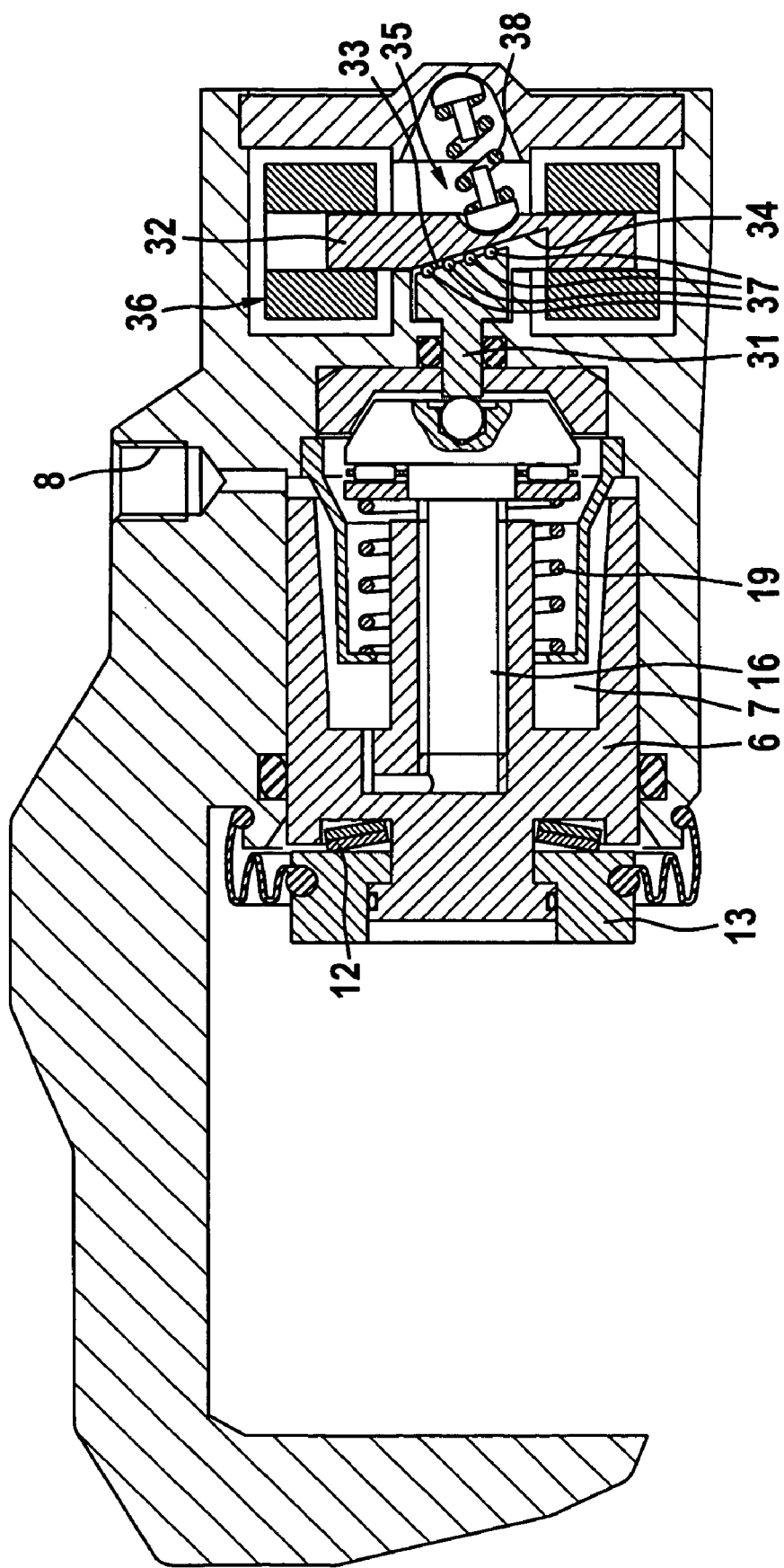
FIGS. 2a, b are simplified views of a second design of the hydraulic brake of the invention in the released and locked conditions.
Figure 2B:
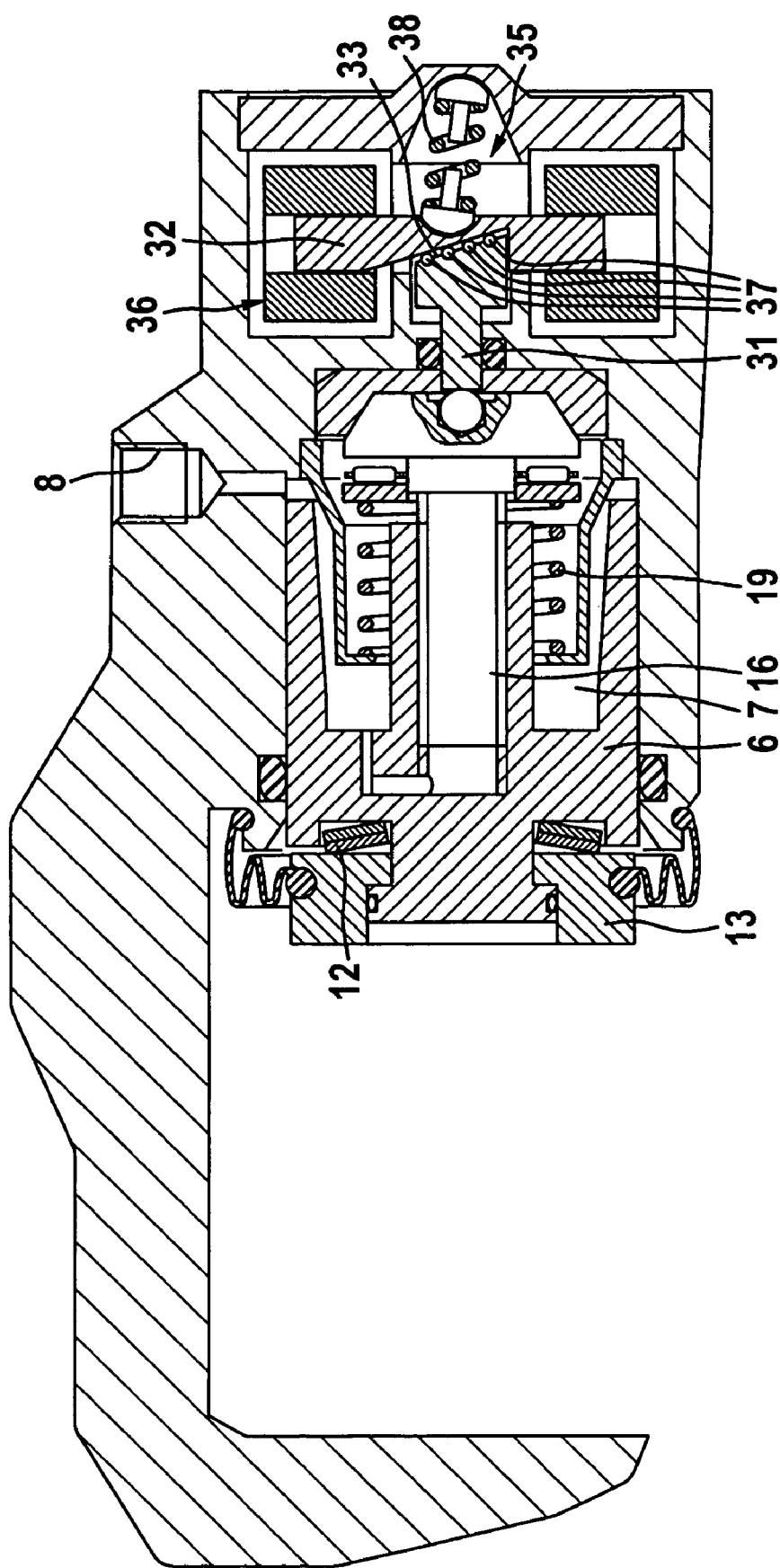

In the second design of the brake of the invention as shown in FIGS. 2a, b, the device for activating the locking device mentioned with respect to the first design shown in FIG. 1 is configured as an electromechanically or electromagnetically operable device 35 which is, essentially composed of an actuating element 31 that is in a force-transmitting connection with the spindle 16, and of a second actuating element 32 operable by means of an electromagnetic assembly 36 and being preferably formed of the armature of the electromagnetic assembly 36. The first actuating element 31 includes a first slope or ramp 33 cooperating with a second slope or ramp 34 designed at the second actuating element 32. To minimize the friction occurring between the slopes 33, 34, schematically shown rolling elements designated by reference numerals 37 are provided. Further, an elastic means 38 is provided for retaining the second actuating element 32 in its end positions, said means being preferably configured as a compression spring having two supporting end pieces. As can be seen in the drawing, FIG. 2a shows the second design in the released condition of the locking device, while FIG. 2b illustrates the locking device in the locked condition.

Figure 3A:
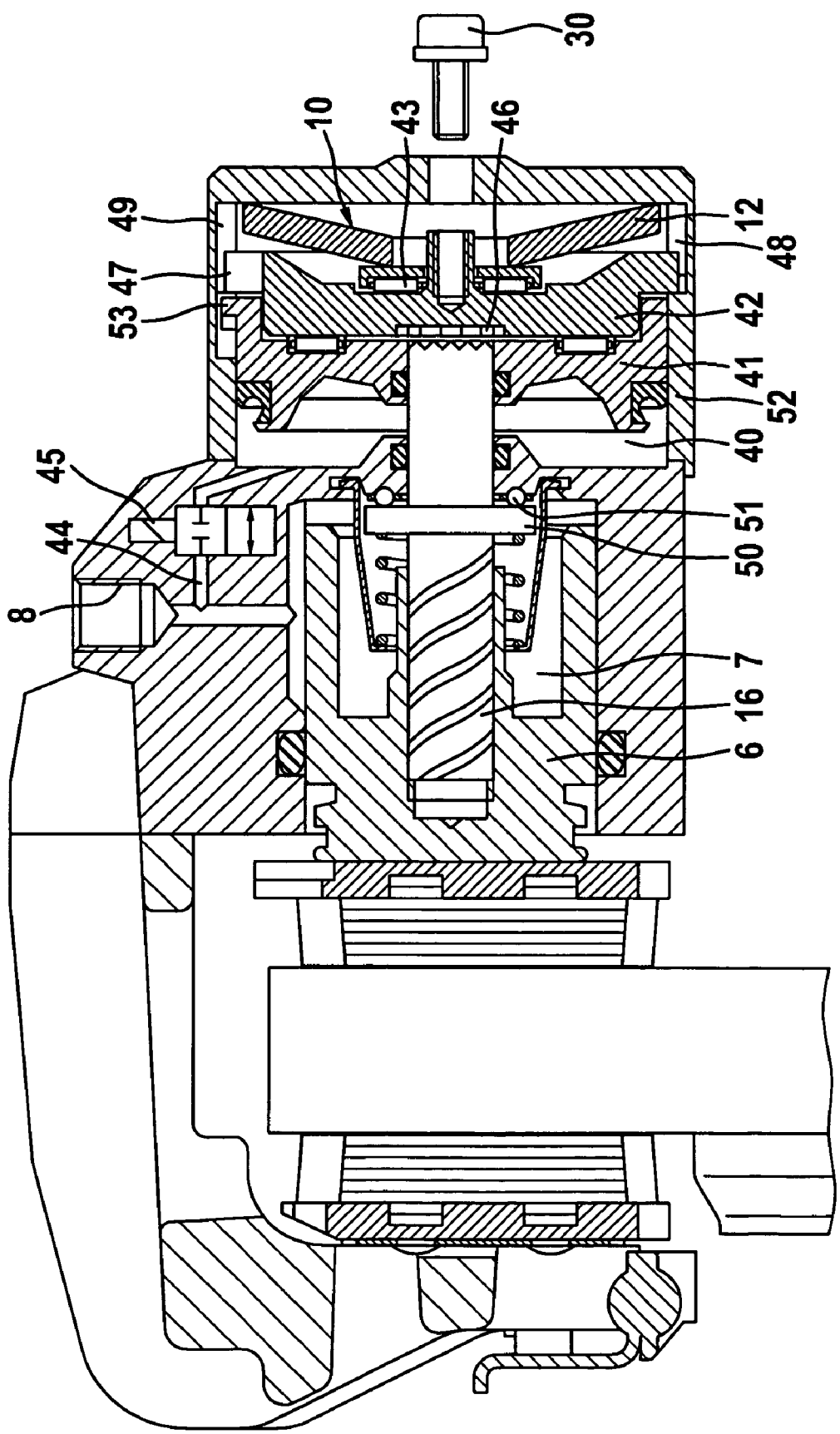
FIGS. 3a, b are axial cross-sectional views of a third design of the hydraulic brake of the invention in a representation corresponding to FIGS. 2a, b.
Figure 3B:
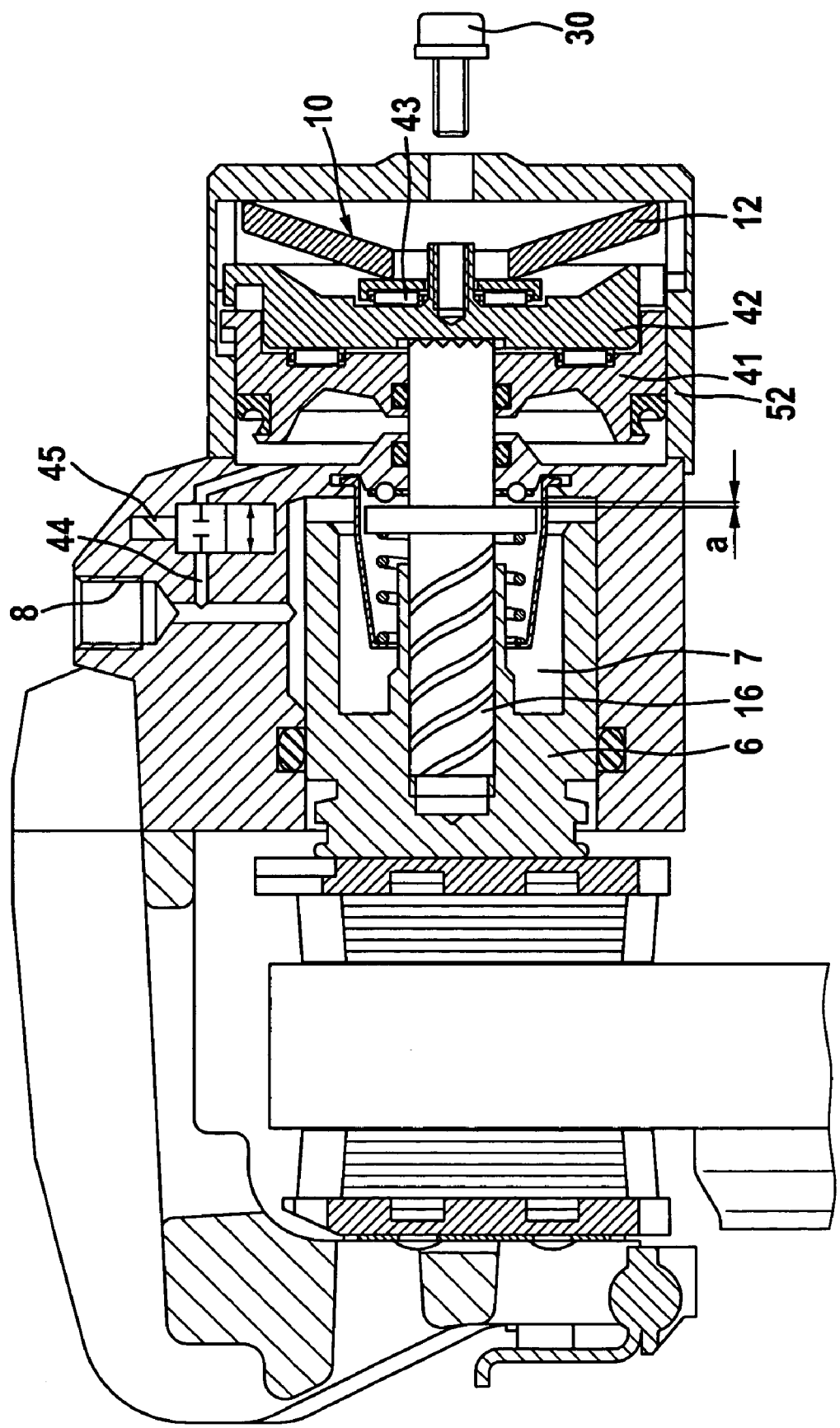

In the third design, which is exhibited in FIGS. 3a, b in the released or locked condition of the locking device, respectively, the energy accumulator 10 is arranged at the end of the spindle 16 remote from the brake piston 6 and essentially contains a hydraulic accumulator pressure chamber 40, an accumulator piston 41 delimiting the accumulator chamber 40 and the above-mentioned spring element 12 that is configured as a cup spring in the example shown. The spring element 12 is supported through an axial bearing 43 on an adjusting ring 42 that is in a force-transmitting connection with the control piston 41 and is arranged so as to be rotatable within limits. The accumulator pressure chamber 40 is connected by way of a hydraulic connection 44 to the hydraulic port 8 mentioned with respect to the first design according to FIG. 1, and an electromagnetically operable, preferably normally closed (NC) valve 45 is inserted into the connection 44, said valve being used to close or open the connection 44. In this arrangement, the brake piston 6 forms a threaded nut cooperating with the spindle 16 by way of a non-self-locking thread. Spindle 16 is supported on an axial bearing 51 by means of a radial bead 50. The end of the spindle 16 remote from the brake piston 6 that extends through the control piston 41 in an axial direction has fine teeth being movable into engagement with a mating design of a medium recess 46 in the adjusting ring 42. The fine teeth along with the adjusting ring 42 form the locking device, said adjusting ring 42 including guiding projections 47 that cooperate with guiding grooves 48, 49 of different length being designed in the wall of a cylindrical housing 52 in which the energy accumulator 10 and the locking device are incorporated. The length of the short guiding groove 48 determines the end position of the adjusting ring 42 that corresponds to the release condition of the locking device, while the boundary of the longer guiding groove defines the end position of the adjusting ring 42 corresponding to the locked condition of the locking device. Further, the long guiding groove 49 accommodates a projection 53 provided at the control piston 41 and serving as a rotation prevention mechanism of the control piston 41. When the parking brake device is being locked, hydraulic pressure is applied to the control piston 41, displacing it to the right in the drawing so that the adjusting ring 42 is lifted from its locked position shown in FIG. 3a and starts rotating. As this occurs, it proves particularly favorable that the effective diameter of the control piston 41 is selected to be larger than the effective diameter of the brake piston 6 in order to reduce the activating pressure of the parking brake device. When the pressure acting on the control piston 41 is subsequently reduced, the adjusting ring 42 is shifted to the left by the force of the cup spring 12 so that its internally toothed recess 46 is moved into engagement with the finely toothed end of spindle 16. As shown in FIG. 3b, the spindle 16 is locked against rotation by way of engagement with the adjusting ring 42 so that the force generated by the cup spring 12 is transmitted onto the brake piston 6. The above-mentioned radial bead 50 of the spindle 16 is at a distance a from the axial bearing 51 in the locked condition of the parking brake device.

To release the parking brake device, the valve 45 is first of all opened by means of a corresponding actuating signal, the control piston 41 is again acted upon by hydraulic pressure and displaced to the right in the drawing so that the adjusting ring 42 is lifted from its position shown in FIG. 3b, continues rotating and, in a subsequent reduction of the pressure acting on the control piston 41, adopts the end position illustrated in FIG. 3a which is predetermined by the stop of its guiding projection 47 at the boundary of the short guiding groove 48.

Figure 4:
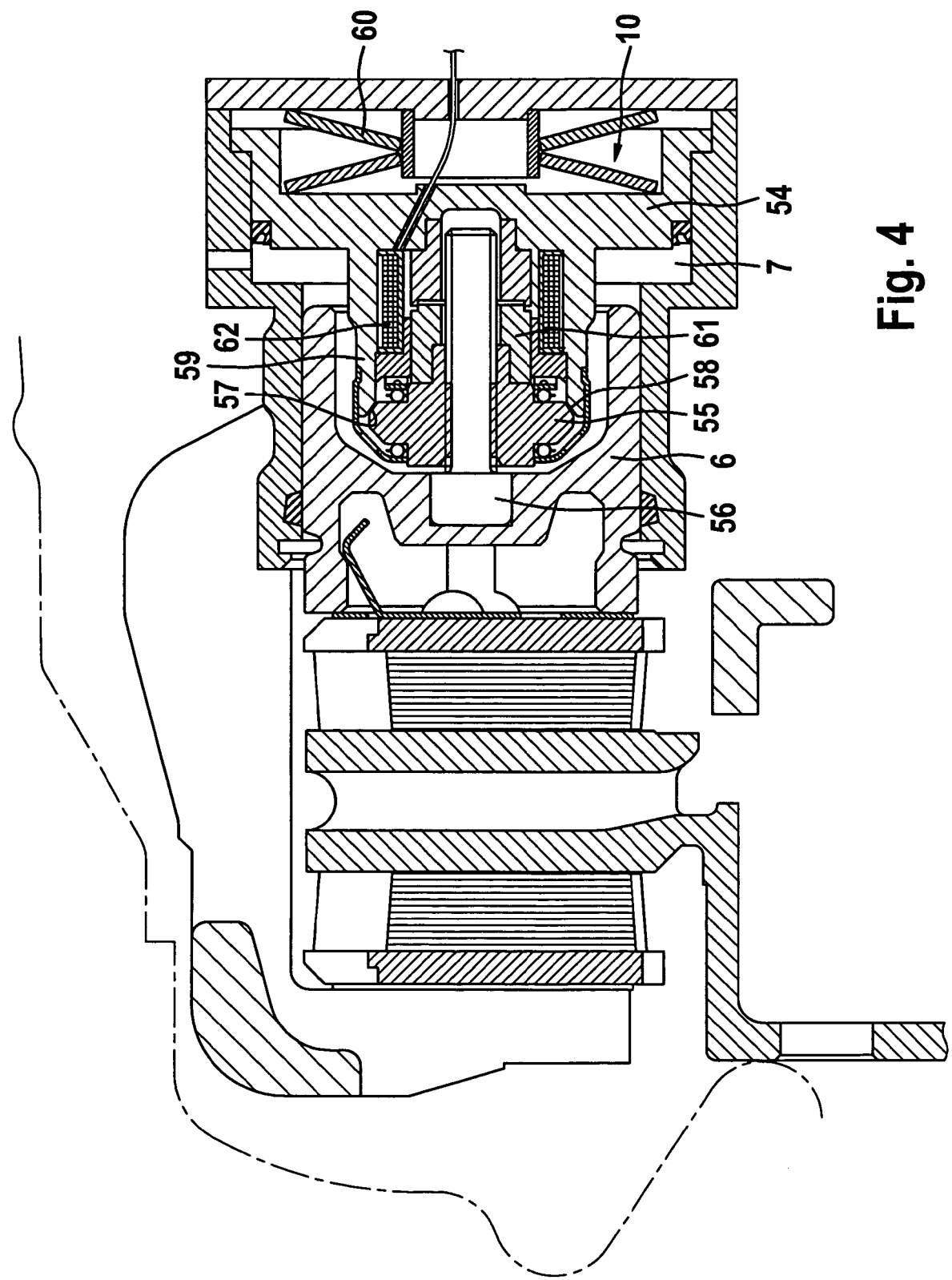
FIG. 4 is an axial cross-sectional view of a fourth design of the hydraulic brake of the invention.

The arrangement of the energy accumulator 10 in the fourth embodiment of the subject matter of the invention illustrated in FIG. 4 corresponds to the third design according to FIGS. 3a, b. In this design the service pressure chamber 7 is additionally used as an accumulator pressure chamber, which is delimited by an accumulator piston 54 on the right-hand side in the drawing. The above-mentioned spring element is formed of a spring assembly 60 being supported on the accumulator piston 54. The locking device is again configured as a threaded-nut/spindle assembly, having its spindle 56 rigidly connected to the brake piston 6. A threaded nut 55 coupled with the spindle 56 by way of a non-self-locking thread includes a first friction surface 57, which cooperates with or is moved into engagement with a second friction surface 58 when the parking brake device is locked. In this arrangement, the second friction surface 58 is preferably designed at the end of an axial extension 59 of the accumulator piston 54, said extension extending in the direction of the brake piston 6. Moreover, there is provision of an electromagnetic device 61, 62 being received by the extension 59. Armature 61 of the electromagnetic device 61, 62 forms a tension force transmitting element which is rigidly connected to the threaded nut 55 so that, upon energization of the coil 62, the armature 61 is tightened and closes the slot between the two friction surfaces 57, 58, with the result that a rigid coupling between the brake piston 6 and the accumulator piston 54 is safeguarded.

Figure 5:
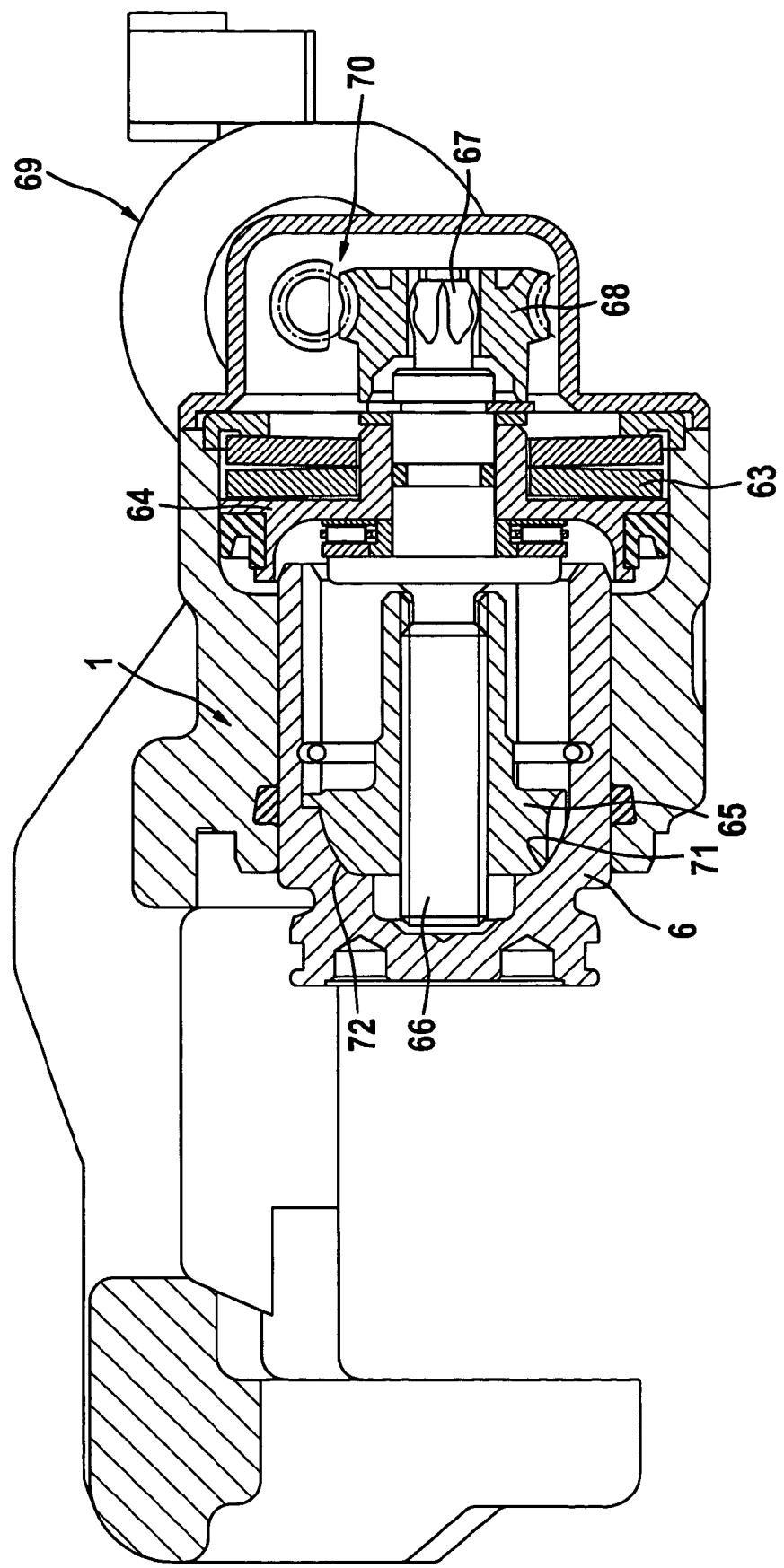
FIG. 5 is a partial view of a fifth design of the hydraulic brake of the invention.

Likewise the fifth embodiment of the invention illustrated in FIG. 5 has a similar design of the locking device. The accumulator piston 64 is additionally used as a radial guide of the spindle 66 of the threaded-nut/spindle assembly, with a cardan-type joint 67 being designed at the end of the spindle 66. Said joint 67 cooperates with a toothed wheel 68 of an angular gear 70 that is used to transmit the rotation of the output shaft of an electric motor 69 onto the spindle 66. A threaded nut 65 coupled to the spindle 66 by means of a self-locking thread includes a first contact surface 71, which cooperates with or is moved into engagement with a second contact surface 72 when the parking brake device is locked. Said second contact surface 72 is preferably designed in the brake piston 6.

When the parking brake is applied, hydraulic pressure is built up in the service pressure chamber 7, exactly as in the design according to FIG. 4, said pressure causing displacement of the brake piston 6 to the left in the drawing, on the one hand, and movement of the accumulator piston 64 to the right, on the other hand, so that the spring assembly designated by reference numeral 63 is biased to a still greater extent. A subsequent actuation of the electric motor 69 and a rotation of the spindle 66, respectively, will cause a translational movement of the threaded nut 65 in the direction of the brake piston 6 until the contact surfaces 71, 72 are moved into engagement with each other. This action causes the parking brake to assume a locked condition. When the parking brake is released, hydraulic pressure is again built up in the service pressure chamber 7 so that the spindle 66 is relieved and, due to actuation of the electric motor 69, turned back in the direction opposite to the actuating direction so that the contact surfaces 71, 72 are disengaged and the brake piston 6 can be passed over into a non-actuated position.

Figure 6:
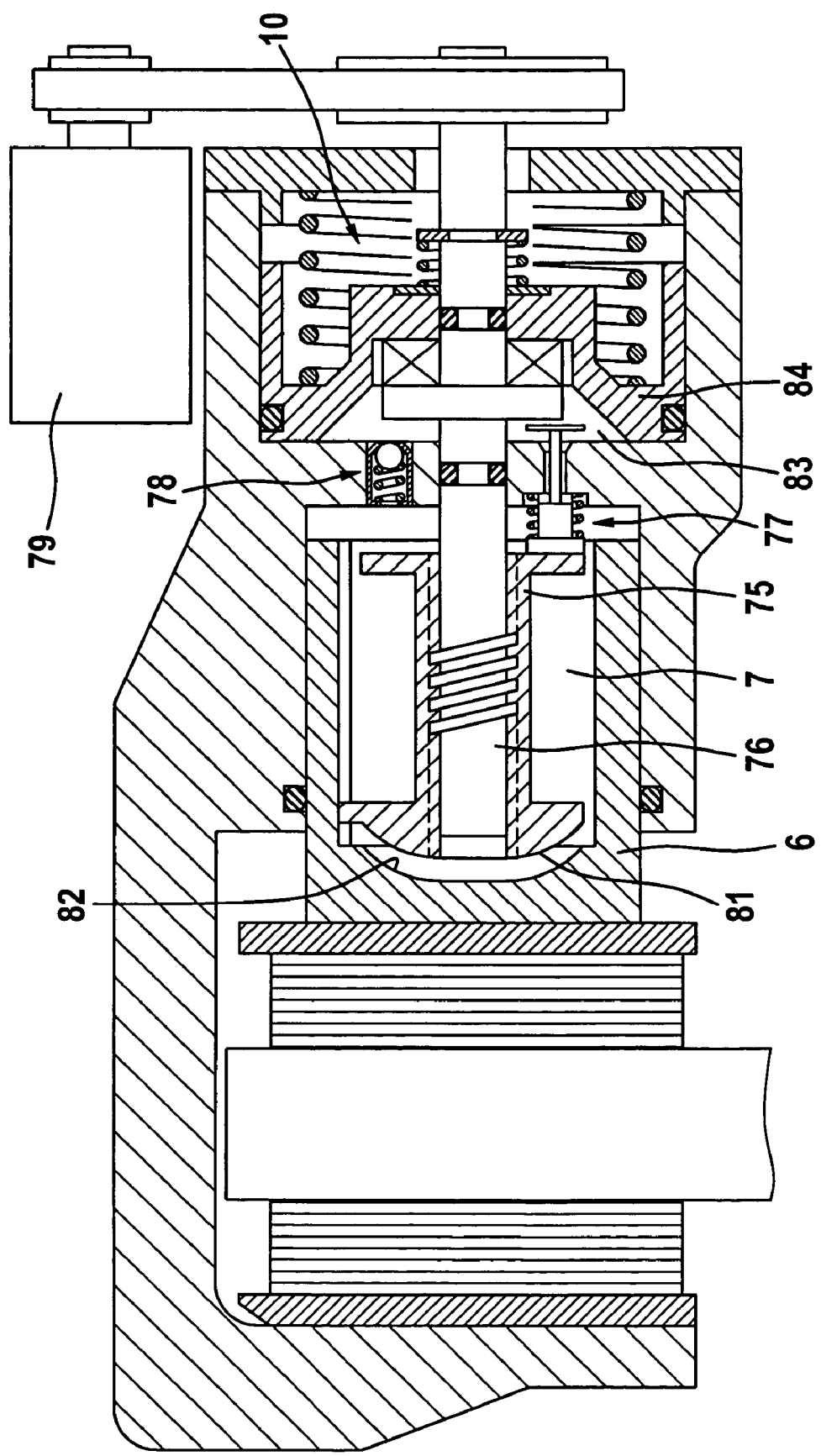
FIG. 6 is an axial cross-sectional view of a sixth design of the subject matter of the invention.

In the sixth design of the subject matter of the invention depicted in FIG. 6, the service pressure chamber 7 is isolated from the accumulator pressure chamber 83, and a separating valve 77 that is operable preferably mechanically is inserted into the connection of the two chambers 7 and 83. Like in the previous design, the locking device is again configured as a spindle/nut assembly, the spindle being designated by reference numeral 76, the threaded nut by reference numeral 75, and the corresponding contact surfaces being designated by reference numerals 81, 82. Further, a non-return valve 78 opening towards the service pressure chamber 7 is provided in a second connection between the service pressure chamber 7 and the accumulator pressure chamber 83. An electric motor 79 driving the spindle 76 is arranged so that its longitudinal axis extends in parallel to the longitudinal axis of the spindle/nut assembly. The threaded nut 75 is of course guided in the brake piston 7 in an unrotatable fashion. Because the mode of functioning of the sixth design basically corresponds to the fifth design, it need not be explained in detail.

Figure 7:
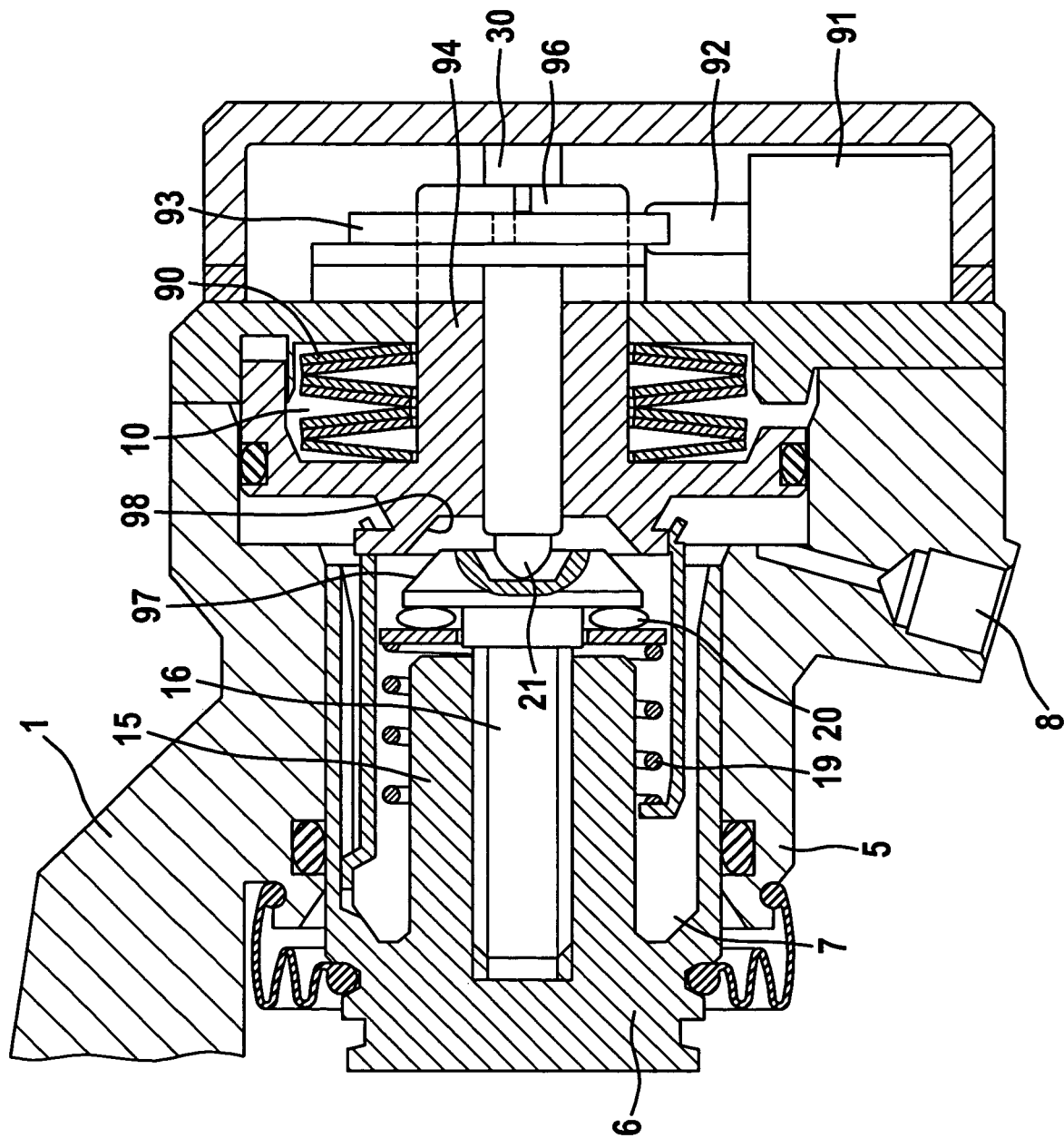
FIG. 7 is an axial cross-sectional view of a seventh design of the hydraulic brake of the invention, shown in part only.

In a seventh design which is illustrated in the released condition of the locking device in FIG. 7, the energy accumulator 10 is arranged at the side of the brake housing 1 remote from the brake piston 6 and mainly comprises an accumulator piston 94 delimiting the service pressure chamber 7 and a spring element 90. Similar to the embodiment shown in FIG. 4, the service pressure chamber 7 in this design is additionally used as an accumulator pressure chamber. Again the locking device is configured as a threaded-nut/spindle assembly having its threaded nut 15 integrally designed with the brake piston 6. A spindle 16 coupled to the threaded nut 15 by means of a non-self-locking thread includes a first friction surface 97, which cooperates with a second friction surface 98 at the accumulator piston 94 when the parking brake device is locked.

Further, an arresting unit 91 is provided being shown in a lateral view in FIG. 8a. The arresting unit 91 is arranged outside the energy accumulator 10 and formed by an electromagnet 95 whose armature 92 is rigidly connected to a slide 93. The accumulator piston 94 is blocked by the slide 93 during service brake operations by way of preventing a translational movement of a force-transmitting part 96 that is rigidly connected to the accumulator piston 94 in the direction of the brake piston 6. For this purpose, the force-transmitting part 96 is so designed that it includes two projections being received in notches in the slide 93. As can be taken from FIG. 8a in particular, the force-transmitting part 96 is inhibited in moving in the direction of the brake piston 6 by the projections taking support on the slide 93. When the slide 93 is moved by the electromagnet 95 in such a fashion that the projections of the force-transmitting part 96 align with the notches at the slide 93, the force-transmitting part 96 and the accumulator piston 94, respectively, can move in the direction of the brake piston 6. This position of the slide 93 and the armature 92 is shown in dotted lines in FIG. 8a. A translational movement of the force-transmitting part 96 in the opposite direction beyond the position illustrated in FIG. 8a is likewise suppressed because the accumulator piston 94 in this direction comes into abutment with respect to the brake housing 1. This prevents an additional volume intake in the service pressure chamber 7 during service brake operations, which volume intake would be caused by an accumulator piston 94 moving to the right in the drawing.

When the parking brake device is applied, hydraulic pressure is built up in the service pressure chamber 7 causing both displacement of the brake piston 6 to the left in the drawing and relief of the accumulator piston 94 in opposition to the effect of force of the spring element 90. The slide 93 is operable after this relief and can release the force-transmitting part 96 because the notches of the slide 93 are brought into coincidence with the projections of the force-transmitting part 96. After the actuation of slide 93, the hydraulically biased spring element 90 induces a translational movement of the accumulator piston 94 in the direction of the brake piston 6 until the friction surfaces 97, 98 are engaged, with the result that the parking brake device is set into a locked condition. As this occurs, the spindle 16 lifts from the central bearing 21, and the spring assembly 90 acts by means of the closed flux of force from the accumulator piston 94 through the threaded-nut/spindle assembly to the brake piston 6 and generates a component of the application force that is necessary to perform the parking brake operation. To release the parking brake device, again hydraulic pressure is built up in the service pressure chamber 7 and the accumulator piston 94 is displaced to the right in FIG. 7, with the spring element 90 being hydraulically biased. It is favorable in this arrangement that the effective diameter of the accumulator piston 94 is chosen to exceed the effective diameter of he brake piston 6, with the result that the activation pressure of the parking brake device is reduced. The accumulator piston 94 is blocked again by the slide 93 by means of the force-transmitting part 96 in the released condition of the parking brake device. Further, a mechanical means 30 can be provided to release the locking device.

The coil 89 of the electromagnet 95 fulfills the function of a sensor for detecting the position of the slide 93, where it can be detected whether the force-transmitting part 96 is freed or blocked, or whether the parking brake device is released or locked, respectively. This can prevent an inadvertent locking of the parking brake device during the service brake operations. Besides, the condition of the vehicle brake or of the parking brake device can be found out by determining the slide position. When e.g. the brake pads are worn out or the spring 19 (whose function has been described already by way of FIG. 1) preloading the spindle 16 is defective, the brake piston 6 will move during actuation further to the left in the drawing than in the normal case. The result is that the accumulator piston 94 freed by the slide 93 for locking the parking brake device will also move further to the left. The end of the force-transmitting part 96 remote from the brake piston 6 is thereby positioned outside the range of motion of the slide 93. When the slide 93 is actuated in this situation, it will move further away from the electromagnet 95 than in the previously explained arresting positions. This condition is detected by a determination of the slide position.

To reliably determine the slide position, the self-inductance variation of the coil 89 of the electromagnet 95 induced by the armature movements is determined. This is done by means of applying square-wave voltage pulses to the coil 89. The variation of the current flowing through the coil 89 is additionally determined. This current variation leads to conclude the position of the armature 92 and, hence, the position of the slide 93. When the position of the armature 92 changes, the variation of the current flowing through the coil 89 will change as well.

FIG. 8b depicts an arresting unit 91 having two electromagnets 95, 105. Both armatures 92, 102 are rigidly connected to the slide 93 in this design. This is advantageous because it renders possible a mutual control by means of a comparison of the two armature positions, because the self-inductance variations of the two coils 89, 109 can be separately determined. In addition, the position can be determined continuously because the first coil 89 actuates the armature 92 and the slide 93 connected to it as well as the second armature 102, while the position of the two armatures 92, 102 and the slide 93 is determined by means of the change of the current variation in the second coil 109. Also, this arrangement can monitor the pressure introduced into the service pressure chamber 7, When e.g. during pressure buildup which is necessary for the parking brake operation, the first electromagnet 95 is actuated in such a fashion that it would actuate the two armatures 92, 102 and the slide 93 as soon as the accumulator piston 92 is adequately relieved due to the pressure buildup, this pressure value can be detected by way of the method with the second electromagnet 105 described already. A corresponding operation may, of course, also be performed during pressure buildup for terminating a parking brake operation.

FIG. 8c illustrates another embodiment of the arresting unit 91. Arresting unit 91 is herein configured as a piezoelectric actuator 103, which is basically formed of a piezoelectrically actuated transverse beam 101. Said transverse beam 101 is received in a recess at slide 93 and adopts an intermediate actuating position in the voltageless condition. By applying a voltage to the transverse beam 101, the transverse beam 101 is deformed and actuates the slide 93, whereby the force-transmitting part 96 is blocked or freed. To sense the slide position, the current consumption and/or the capacity of the piezoelectrically actuated transverse beam 101 is measured in this design. An embodiment with two piezoelectric actuators (not shown), similar to the design in FIG. 8b with two electromagnets (95, 105), is also part of the invention.

Instead of the transversely moving slide 93, the slide 93 may also be designed in such a fashion that it turns about its own axis while actuated by the electromagnets 95, 105 and, thus, blocks or frees the force-transmitting part 96.

As has been mentioned already, various preferably independently actuatable pressure-generating aggregates are employed for pressure development both in the service pressure chamber 7 and in the accumulator pressure chamber 22, 40. Thus, it is e.g. possible to use a hydraulic pump, which has the purpose of an independent energy source of an electrohydraulic brake system. It is also feasible to utilize an actuating unit with an independently actuatable brake booster and a master brake cylinder connected downstream of the brake booster. Alternatively, however, a pressure generator operable by the vehicle operable may also be used.

The invention claimed is:

1. A hydraulic vehicle brake equipped with a parking brake device, in particular for motor vehicles, including a brake housing in which a hydraulic service pressure chamber is delimited by a brake piston, with the parking brake device acting on the brake piston and, in the applied condition, being lockable by means of a locking device, and an energy accumulator cooperating with the brake piston being equipped with at least one integrated spring element, wherein the parking brake device is operable by a pressure that is introduced into the service pressure chamber and enables charging the energy accumulator, and wherein an arresting unit, formed of at least one electromagnet with a coil that fulfils the function of a sensor for sensing the position of a slide actuated by an armature of the electromagnet, is provided which maintains the energy accumulator in its charged condition during service brake operations.

2. The hydraulic vehicle brake as claimed in claim 1, wherein the service pressure chamber is delimited by the brake piston on one side and by an accumulator piston on the other side, with a spring assembly supported on the accumulator piston, and a first contact or friction surface and a second contact or friction surface are moved into engagement with each other upon actuation of the locking device, and are disengaged from one another during release.

3. The hydraulic vehicle brake as claimed in claim 2, wherein a means is provided for releasing the parking brake in a case of emergency, said means cooperating with the brake piston or the accumulator piston respectively.

4. The hydraulic vehicle brake as claimed in claim 1, wherein the coil fulfils the function of a sensor for at least one of monitoring the pressure introduced into the service pressure chamber or detecting the condition of the vehicle brake or the parking brake device.

5. The hydraulic vehicle brake as claimed in claim 1, wherein pressure buildup both in the service pressure chamber and an accumulator pressure chamber, respectively, takes place by means of a hydraulic pump which is used as an independent pressure source of an electrohydraulic brake system.

6. The hydraulic vehicle brake as claimed in claim 1, wherein pressure buildup both in the service pressure chamber and an accumulator pressure chamber, respectively, takes place by means of a pressure generator operable by the vehicle operator.

7. A hydraulic vehicle brake equipped with a parking brake device, in particular for motor vehicles, including a brake housing in which a hydraulic service pressure chamber is delimited by a brake piston, with the parking brake device acting on the brake piston and, in the applied condition, being lockable by means of a locking device, and an energy accumulator cooperating with the brake piston being equipped with at least one integrated spring element, wherein the parking brake device is operable by a pressure that is introduced into the service pressure chamber and enables charging the energy accumulator, wherein an arresting unit, formed of at least two electromagnets, and the armatures of the electromagnet act upon a slide, and a coil of the first electromagnet actuates the slide, while the a coil of the second electromagnet fulfils the function of a sensor for detecting the slide position, is provided which maintains the energy accumulator in its charged condition during service brake operations.

8. The hydraulic vehicle brake as claimed in claim 7, wherein the coils fulfill the function of a sensor for detecting the slide position, unless the coils fulfill the function of an actuator for actuating the slide.

9. A hydraulic vehicle brake equipped with a parking brake device, in particular for motor vehicles, including a brake housing in which a hydraulic service pressure chamber is delimited by a brake piston, with the parking brake device acting on the brake piston and, in the applied condition, being lockable by means of a locking device, and an energy accumulator cooperating with the brake piston being equipped with at least one integrated spring element, wherein the parking brake device is operable by a pressure that is introduced into the service pressure chamber and enables charging the energy accumulator, wherein an arresting unit, formed of at least one piezoelectric actuator that actuates a slide and the at least one piezoelectric actuator detects the slide's position, is provided which maintains the energy accumulator in its charged condition during service brake operations.

10. The hydraulic vehicle brake as claimed in claim 9, wherein the at least one piezoelectric actuator fulfils the function of a sensor for at least one of monitoring the pressure introduced into the service pressure chamber or detecting the condition of the vehicle brake or the parking brake device.

* * * * *